United States Patent
Nakamoto et al.

(10) Patent No.: US 8,515,981 B2
(45) Date of Patent: Aug. 20, 2013

(54) PROGRAM DISTRIBUTION SERVER, IMAGE FORMING APPARATUS, PROGRAM DISTRIBUTION SYSTEM, AND CONTRACT DOCUMENT INTEGRATION METHOD

(75) Inventors: Hisashi Nakamoto, Yokohama (JP); Katsushi Sunagawa, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 13/123,743

(22) PCT Filed: Dec. 22, 2009

(86) PCT No.: PCT/JP2009/007099
§ 371 (c)(1),
(2), (4) Date: Apr. 12, 2011

(87) PCT Pub. No.: WO2010/073606
PCT Pub. Date: Jul. 1, 2010

(65) Prior Publication Data
US 2011/0202548 A1      Aug. 18, 2011

(30) Foreign Application Priority Data

Dec. 25, 2008  (JP) .................................. 2008-331018

(51) Int. Cl.
*G06F 17/30*      (2006.01)
(52) U.S. Cl.
USPC ........................................................ 707/758
(58) Field of Classification Search
None
See application file for complete search history.

(56) References Cited

U.S. PATENT DOCUMENTS

| 7,421,214 | B2 | 9/2008 | Ikeno et al. ........................ 399/8 |
| 7,870,075 | B1 * | 1/2011 | Sabet .............................. 705/52 |
| 8,160,964 | B2 * | 4/2012 | Burkhart et al. ................ 705/59 |
| 2002/0188608 | A1 | 12/2002 | Nelson et al. .................... 707/10 |
| 2005/0125359 | A1 | 6/2005 | Levin et al. ..................... 705/59 |
| 2008/0027742 | A1 | 1/2008 | Maeda .............................. 705/1 |
| 2010/0122233 | A1 * | 5/2010 | Rath et al. ..................... 717/105 |

FOREIGN PATENT DOCUMENTS

| JP | 2002-132759 | | 5/2002 |
| JP | 2006-31494 | | 2/2006 |
| JP | 2006-031494 A | * | 2/2006 |
| JP | 2008-33561 | | 2/2008 |
| JP | 2008-225559 | | 9/2008 |

* cited by examiner

*Primary Examiner* — Belinda Xue
(74) *Attorney, Agent, or Firm* — Fitzpatrick, Cella, Harper & Scinto

(57) ABSTRACT

The EULA dependency relationship determination section determines from the EULA dependency relationship information included in the received data whether or not there is any EULA to be included in another EULA of a plurality of EULAs. The first deletion processing section deletes the EULA that has been determined to be included in another EULA by the EULA dependency relationship determination section. The integration section integrates the remaining EULAs after the processing performed by the first deletion processing section is complete. The second deletion processing section extracts any overlapping portions from the EULA that has been integrated by the integration section and deletes an unwanted part so as not to overlap. The EULA authorization section authorizes the EULA that has been subjected to the processing performed by the second deletion processing section.

7 Claims, 13 Drawing Sheets

Fig. 11

| INTEGRATED PRODUCT (1101) | TARGET SOFTWARE (1102) | EULA ID (1103) | PRIORITY (1104) | DEPENDENCE RELATIONSHIP (1105) | SOFTWARE PRODUCTION COMPANY (1106) |
|---|---|---|---|---|---|
| Z | A | A | 1 | INCLUDE D | COMPANY C |
| Z | B | B | 2 | INDEPENDENT | COMPANY C |
| Z | C | C | 2 | INDEPENDENT | COMPANY C |
| Z | D | D | 3 | INDEPENDENT | COMPANY C |
| Y | E | E | 1 | INDEPENDENT | COMPANY C |
| Y | F | F | 3 | INDEPENDENT | COMPANY C |
| Y | G | G | 3 | INDEPENDENT | COMPANY C |
| X | H | H | 1 | INDEPENDENT | COMPANY E |
| X | I | I | 2 | INDEPENDENT | COMPANY R |
| X | J | J | 2 | INDEPENDENT | COMPANY R |
| X | K | K | 3 | INDEPENDENT | COMPANY Z |

PROGRAM DISTRIBUTION SERVER, IMAGE FORMING APPARATUS, PROGRAM DISTRIBUTION SYSTEM, AND CONTRACT DOCUMENT INTEGRATION METHOD

TECHNICAL FIELD

The present invention relates to a program distribution server that distributes a program to an image forming apparatus, an image forming apparatus, a program distribution system, and a contract document integration method.

BACKGROUND ART

Conventionally, many techniques for distributing firmware for an image forming apparatus have been proposed. In general, when a plurality of software is distributed using a software distribution server, it is required that End User License Agreements (hereinafter referred to as "EULA") for a plurality of software to be distributed be sent for user authorization. However, since the number of EULAs to be authorized increases with the increasing amount of software to be distributed, an approach for treating them collectively is required.

To satisfy such requirements, a technique capable of collectively browsing and authorizing a plurality of electronic documents has been proposed (for example, see Patent Document 1). In this technique, a document authorization system that authorizes the content of the circulated electronic document appends authentication information to the document data to be authorized and generates the authorized document data. After the display of collective authorization data in which a plurality of document data appended with authentication information is merged, authentication information for the entire collective authorization data is appended. In this technique, a plurality of representatives can register document data to be authorized in a file server from a terminal, integrate the document data when being transmitted to an authorizing person, and let him issue collective authorization.

CITATION LIST

Patent Literature

PTL 1
Japanese Patent Laid-Open No. 2002-132759

According to the technique disclosed in Patent Document 1 described above, a plurality of software can be collectively distributed to an image forming apparatus as an integrated product. At this time, EULAs corresponding to each software can be distributed to the image forming apparatus.

However, in the technique disclosed in Patent Document 1 described above, an end user must perform the work of authorizing the EULAs one by one whenever provided software is installed, resulting in very troublesome task. In particular, since the amount of EULA authorization processing is increasing with the increasing the number of software included in the integrated product, an end user needs to confirm similar documents over and over again for authorization and to make a contract therewith, and thereby a more troublesome task is required.

SUMMARY OF INVENTION

The present invention provides a technique that restricts the amount of troublesome EULA authorization processing to the bare minimum so as to improve the efficiency of the installation processing of software provided.

The program distribution server according to an aspect of the present invention includes a program search unit configured to search a program to be distributed; a contract document search unit configured to search a contract document corresponding to the program that has been searched by the program search unit; a distributed data control unit configured to integrate the program that has been searched by the program search unit and the contract document that has been searched by the contract document search unit into one data; and a distribution unit configured to distribute the data that has been integrated by the distributed data control unit to an image forming apparatus that forms and outputs an image from the acquired image data.

The image forming apparatus according to the present invention, which forms and outputs an image from the acquired image data, includes a contract document dependency relationship determination unit configured to determine from contract document dependency relationship information included in the acquired data whether or not there is any document included in another contract document among a plurality of contract documents; a first deletion processing unit configured to delete the contract document that has been determined to be included in another contract document by the contract document dependency relationship determination unit; an integration unit configured to integrate the remaining contract documents after the processing performed by the first deletion processing unit is complete; a second deletion processing unit configured to extract an overlapping portion from the contract document that has been integrated by the integration unit and delete an unwanted part so as not to overlap; a contract document authorization unit configured to authorize the contract document that has been subjected to the processing performed by the second deletion processing unit; and a program installation unit configured to install a program included in the acquired data corresponding to the contract document that has been authorized by the contract document authorization unit.

The contract document integration method according to the present invention includes a contract document dependency relationship determination step of determining from contract document dependency relationship information included in the acquired data whether or not there is any document included in another contract document among a plurality of contract documents; a first deletion processing step of deleting the contract document that has been determined to be included in another contract document by the contract document dependency relationship determination step; an integration step of integrating the remaining contract documents after the processing performed by the first deletion processing step is complete; a second deletion processing step of extracting an overlapping portion from the contract documents that have been integrated by the integration unit and deleting an unwanted part so as not to overlap; a contract document authorization step of authorizing the contract document that has been subjected to the processing performed by the second deletion processing step; and a program installation step of installing a program included in the acquired data corresponding to the contract document that has been authorized by the contract document authorization step.

Further features of the present invention will become apparent from the following description of exemplary embodiments (with reference to the attached drawings).

BRIEF DESCRIPTION OF DRAWINGS

FIG. 12-B is a block diagram illustrating a configuration of an EULA control section 1205.

DESCRIPTION OF EMBODIMENTS

Figure 1:
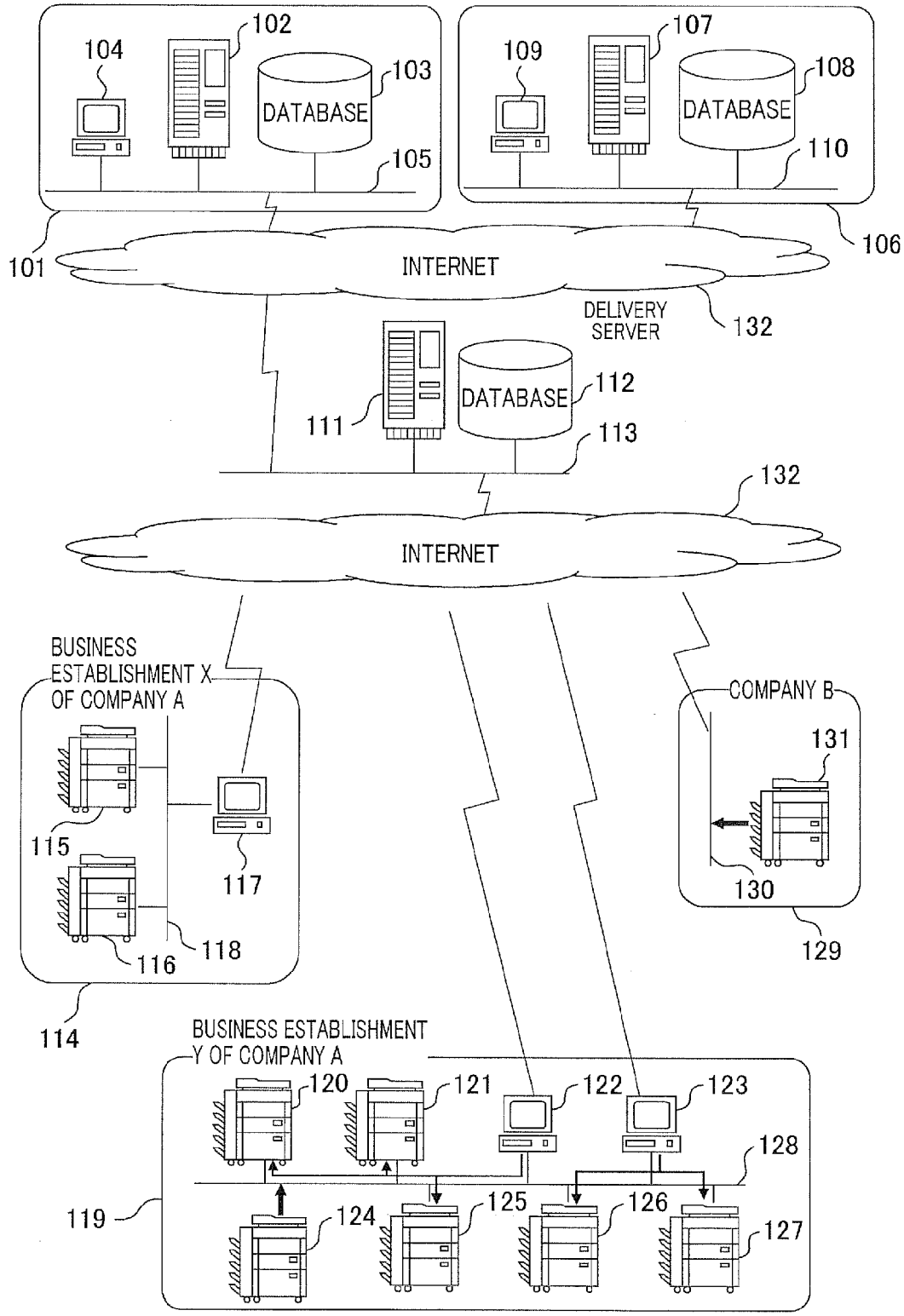
FIG. 1 is a schematic diagram illustrating a software distribution system according to an embodiment of the present invention.

Hereinafter, embodiments of the present invention will now be described with reference to the accompanying drawings.
<System Configuration>
FIG. 1 is a schematic diagram illustrating a software distribution system according to an embodiment of the present invention. As shown in FIG. 1, a plurality of sales companies including sales companies 101 and 106 are connected to the present system. The sales companies 101 and 106 respectively have databases 103 and 108 that store sales information about their sales and customers, and system-related information. The sales companies 101 and 106 respectively have PCs (personal computers) 104 and 109 that perform control such as data registration and correction to the databases 103 and 108. In addition, the sales companies 101 and 106 respectively have hosts 102 and 107 that manage the databases 103 and 108. The PCs 104 and 109 access a website provided by a software distribution server 111 to perform data browsing or the like. Note that each of the hosts 102 and 107 has an operation section and a display section and can also serve as the PCs 104 and 109, respectively. The host 102, the database 103, and the PC 104 are connected via a Local Area Network (LAN) 105. The host 107, the database 108, and the PC 109 are connected via a LAN 110.

In FIG. 1, each system on the sales company side is shown such that it is configured by a plurality of devices. However, the system may be configured by a single device, provided that each function to be described below can be achieved. For example, the databases 103 and 108 may be physically present in the hosts 102 and 107, respectively. Furthermore, if accessible from the hosts 102 and 107, the databases 103 and 108 may present at another location via an Internet 132. That is, the system may be configured by a plurality of devices or a single device.

In the present system, the software distribution server 111 exists in the middle of the sales company side and customer side. A database 112 stores firmware and applications that are applied to an image forming apparatus, a contract document (s) (e.g., End User License Agreement, hereinafter referred to as "EULA"), software license information, and the like. The contract document is not limited to an End User License Agreement, but may be other contract documents relating to sales, distribution, and development of software, such as contract document relating to export bans on software. The software distribution server 111 and the database 112 are connected via a LAN 113, and the LAN 113 is connectable to the Internet 132. In addition, the database 112 may physically exist in the software distribution server 111. Furthermore, as long as access from the software distribution server 111 is possible, the database 112 may exist in another location via the Internet 132. In the present embodiment, software refers to the reference number 1 or a plurality of programs.

The software distribution server 111 has a function to distribute software and EULA to monitoring devices 117, 122, 123, and 131. The monitoring devices 117, 122, and 123 transmit software and EULAs that have been received from the software distribution server 111 to the image forming apparatus to be monitored. The hosts 102 and 107 of the sales companies can register information of an image forming apparatus and information of software and EULAs to be distributed on the software distribution server 111. Also, the software distribution server 111 provides a WEB page for browsing information accumulated in the database 112 or processed information with respect to a PC being connected via the Internet 132. The WEB page provides a limited browsing content for each sales company, each customer, and each user authority depending on user authentication. Moreover, a part of data can be changed from the WEB page.

In FIG. 1, only each one of the software distribution server 111 and the database 112 is illustrated. However, there is also a case in practice that a plurality of software distribution servers and databases are used for executing distributed processing in order to perform load sharing of software distribution.

Next, a system configuration on the customer side will be described. There are several different customer side environments. The customer systems 114, 119, and 129 are illustrated in FIG. 1. In the customer system 114 (business establishment X of company A), the image forming apparatuses 115 and 116, which are connectable to a LAN 118 connected to the Internet 132, are being monitored by a monitoring device 117. The monitoring device 117 can communicate with the software distribution server 111 via the Internet 132. On the other hand, in the customer system 119 (business establishment Y of company A), the image forming apparatuses on a LAN 128 are monitored by monitoring devices 122 and 123. The image forming apparatuses 120, 121, 124, and 125 are monitored by the monitoring device 122, and the image forming apparatuses 126 and 127 are monitored by the monitoring device 123. In the customer system 129 (company B), the image forming apparatus 131 itself that is connectable to a LAN 130 connected to the Internet 132 can directly communicate with the software distribution server 111 via the Internet 132. The image forming apparatus 131 has functions equivalent to those of the monitoring devices 117, 122, and 123, and can communicate with the software distribution server 111 not through the monitoring device(s).

The following should be noted about the above-described system: (1) The HTTP/SOAP protocol can be used in communication through the Internet in the configuration described above. SOAP is the abbreviation for "Simple Object Access Protocol". SOAP is a protocol for invoking data and services of another computer from a certain computer based on XML (eXtended Markup Language). In the present system, the SOAP is implemented in HTTP. SOAP messages in which supplementary information is attached to an XML document are exchanged in communication by SOAP. Hence, a computer that supports SOAP includes a SOAP message generation section that generates a SOAP message and a SOAP message interpretation section that interprets a SOAP message. In the present embodiment, state information of an image forming apparatus is transmitted to the software distribution server 111 by the SOAP message.

(2) In the aforementioned configuration, each image forming apparatus in company A serves to communicate with the software distribution server 111 through a monitoring device. However, by a change of setting, similar to the image forming apparatus 131 installed in company B, each image forming apparatus of company A can communicate with the software distribution server 111 without going through a monitoring device.

<Hardware Configuration>

Figure 2:
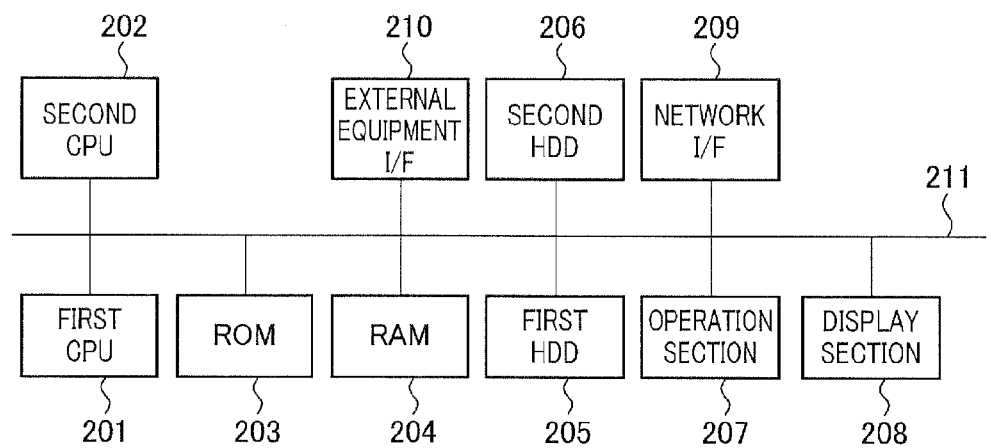
FIG. 2 is a block diagram illustrating a hardware configuration of a software distribution server 111.

Next, the hardware of the software distribution server 111 of the present embodiment will be described. FIG. 2 is a block diagram illustrating a hardware configuration of the software distribution server 111. In addition, hardware configurations of the hosts 102 and 107 are also the same.

In FIG. 2, a first CPU Central Processing Unit (CPU) 201 and a second CPU 202 control each functional section of the software distribution server 111. A Read Only Memory (ROM) 203 stores programs and data for each process of the software distribution server 111. The ROM 203 cannot rewrite the program and data. A Random Access Memory (RAM) 204 electrically stores temporary data for each process of the software distribution server 111. The RAM 204 can rewrite temporary data. A first Hard Disk Drive (HDD) 205 and a second HDD 206 store programs for each process of the software distribution server 111, information relating to an image forming apparatus that distributes various data and software, software to be distributed, EULAs, and the like.

In the software distribution server 111, a program for executing software distribution of the present embodiment is stored in the first HDD 205. The program uses the RAM 204 as a temporary save area, and is invoked and executed by the first CPU 201 or the second CPU 202.

An input device 207 receives an instruction input to the software distribution server 111. This is composed of a keyboard or a pointing device. A display section 208 displays an operation status of the software distribution server 111 and information which each program which operates on the software distribution server 111 outputs. A network I/F (interface) 209 is connected to a LAN and the Internet via a network and exchanges information with an external device. An external equipment I/F (interface) 210 controls connection with an external memory equipment and the like. Each functional section described above is connected through a system bus 211 that serves the flow of data within the device.

Figure 3:
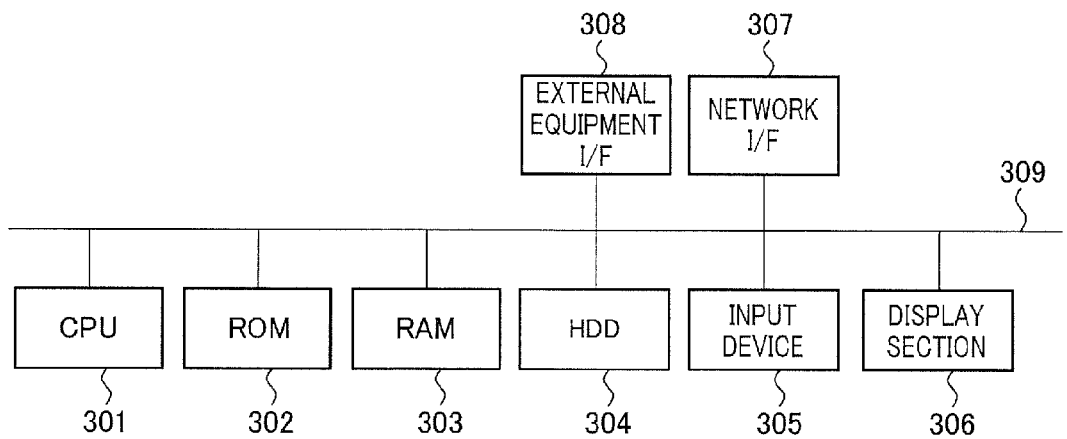
FIG. 3 is a block diagram illustrating a hardware configuration of monitoring devices 117, 122, and 123.

Next, a hardware configuration of the monitoring device will be described. FIG. 3 is a block diagram illustrating a hardware configuration of the monitoring devices 117, 122, and 123. The hardware configurations of the PCs 104 and 109 may be considered to be the same.

In FIG. 3, a CPU 301 manages each process on the monitoring device. A ROM 302 stores programs and data for each process of the monitoring device. The ROM 302 cannot rewrite the program and data. The ROM 303 electrically stores temporary data for each process of the monitoring device. The ROM 303 can rewrite the temporary data. For the monitoring devices 117, 122, and 123, programs for each process of the device, information relating to an image forming apparatus to which data and software are distributed, information that has been received from the software distribution server 111, and the like are stored in a HDD 304. In the PCs 104 and 109, a WEB browser and the like are stored on the HDD 304. An input device 305 receives an instruction input to a monitoring device. This is composed of a keyboard or a pointing device. A display section 306 displays an operation status of the monitoring device and information which the each program which operates on the monitoring device outputs. A network I/F 307 is connected to a LAN and the Internet via a network, and exchanges information with an external device. An external equipment I/F 308 controls connection with an external memory equipment and the like. Each functional section described above is connected via a system bus 309 that serves the flow of data within the device.

Figure 4:
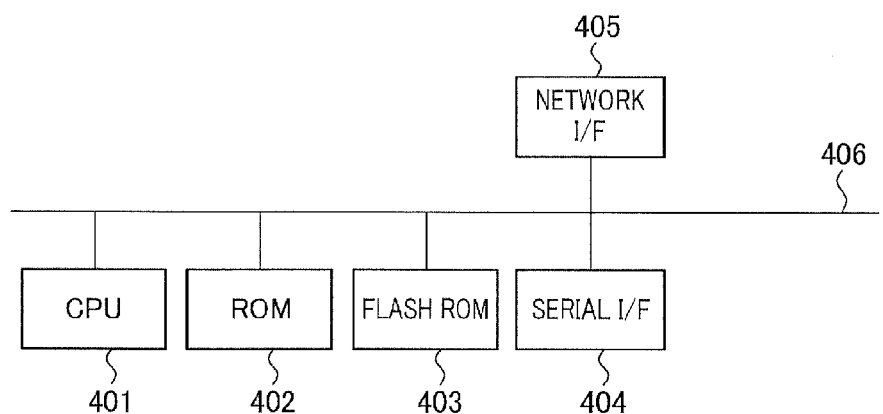
FIG. 4 is a block diagram illustrating another example of a hardware configuration of the monitoring devices 117, 122, and 123.

FIG. 4 is a block diagram illustrating another example of a hardware configuration of the monitoring devices 117, 122, and 123. A CPU 401 manages each process on the monitoring device. A ROM 402 stores programs and data for each process of the monitoring device. The ROM 402 cannot rewrite the program and data. A flash ROM 403 stores data and temporary data for each process of the monitoring device, information relating to the image forming apparatus to be monitored, and the like. A serial I/F 404 outputs error information and log information from the monitoring device. The serial I/F 404 is connectable to a terminal using a serial cable. A network I/F 405 is connected to a LAN and the Internet via a network and exchanges information with an external device. Each functional section described above is connected via a system bus 406 that serves the flow of data within the device.

Figure 5:
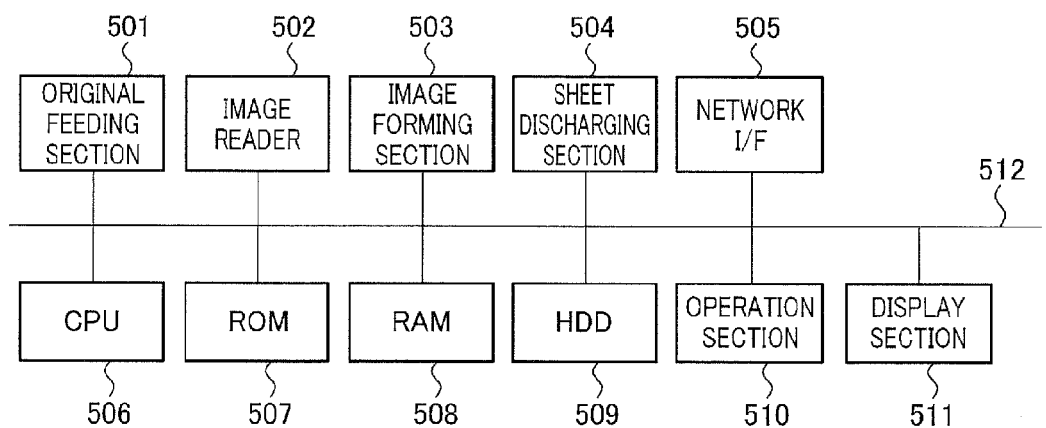
FIG. 5 is a block diagram illustrating a hardware configuration of image forming apparatuses 115, 116, 120, 121, 124, 125, 126, 127, and 131.

Next, a hardware configuration of the image forming apparatus will be described. FIG. 5 is a block diagram illustrating a hardware configuration of the image forming apparatuses 115, 116, 120, 121, 124, 125, 126, 127, and 131. The image forming apparatus employed in the present embodiment envisions a composite machine that is integrally provided with printer and facsimile functions. The composite machine may be a printer (including an electro photographic or ink-jet printer), a scanner, or a facsimile, which receives data from a PC and performs printing. The configuration of the image forming apparatus shown in FIG. 5 envisions a composite machine.

In FIG. 5, an original feeding section 501 feeds an original document into an image reader 502. The image reader 502 reads the original document fed from the original feeding section 501 and converts it into a printing image for printout. An image forming section 503 converts data stored in a storage unit such as a HDD 509 to be described below or data received via a network into a printing image for printout. A sheet discharging section 504 discharges a sheet which is printed and output, and carries out processes such as sorting, stapling, and the like. A network I/F 505 is connected to a LAN and the Internet via a network and exchanges information with an external device. A CPU 506 manages each process on the image forming apparatus. In particular, the CPU 506 monitors an operation status of the image forming apparatus. When the CPU 506 detects an occurrence of a particular event such as failure, it transmits information indicating the state to a predetermined destination. The destination is, for example, the software distribution server 111, a monitoring device, or the like. A ROM 507 that serves as a nonvolatile storage unit stores programs and data for each process of the image forming apparatus. A RAM 508 that serves as a rewritable storage unit electrically stores temporary data for each process of the image forming apparatus. A HDD 509 stores programs and data for each process of the image forming apparatus, user data that has been transmitted from an external device, and the like. The image forming apparatus has a program for executing an image forming process in the HDD 509. The program uses the RAM 508 as a temporary storage area, which is invoked and executed by the CPU 506. An operation section 510 receives an instruction input to the image forming apparatus. A display section 511 displays an operation status of the image forming apparatus and information relating to the operation for the operation section 510. Each functional section described above is connected via a system bus 512 that serves the flow of data within the device.

<Software Configuration>

Figure 6:
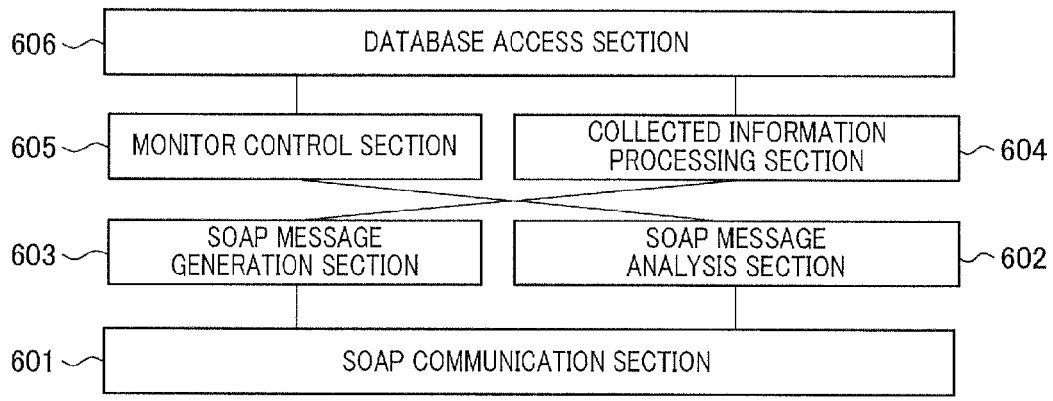
FIG. 6 is a view showing a software configuration of a portion involved in software distribution of the software distribution server 111.

FIG. 6 is a view showing a software configuration of a portion involved in software distribution of the software distribution server 111. A SOAP communication section 601 passes SOAP data, which has been received by the monitoring devices 117, 122, and 123 or the image forming apparatus 131 via the network I/F 209, to a SOAP message analysis section 602. The SOAP message analysis section 602 analyzes the SOAP data. In addition, the SOAP communication section 601 transmits the SOAP data that has been generated by a SOAP message generation section 603 to the monitoring devices 117, 122, and 123 or the image forming apparatus 131 via the network I/F 209. A collected information processing section 604 leaves the information that has been received from the monitoring devices 117, 122, and 123 or the image forming apparatus 131 as is, or performs predetermined processing on such information to store in the database 112 via a database access section 606. A monitor control section 605 controls schedule management that acquires information on the monitoring devices 117, 122, and 123 or the image forming apparatus 131. Furthermore, the monitor control section 605 transmits instructions, if so desired, to the monitoring devices 117, 122, and 123 or the image forming apparatus 131 via the SOAP message generation section 603, the SOAP communication section 601, and the network I/F 209.

Figure 7:
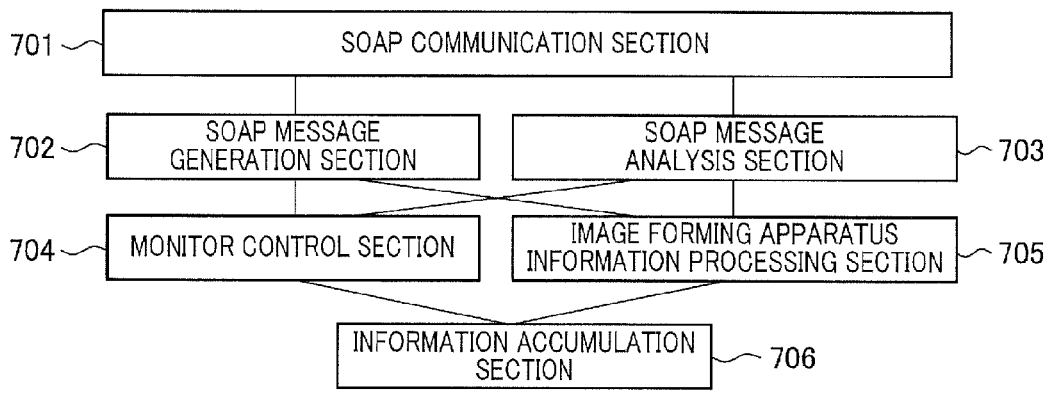
FIG. 7 is a view showing a software configuration of a portion involved in software distribution of the monitoring devices 117, 122, and 123.

FIG. 7 is a view showing a software configuration of a portion involved in software distribution of the monitoring devices 117, 122, and 123. A SOAP communication section 701 passes SOAP data, which has been received by the software distribution server 111 via the network I/F 307 (or network I/F 405), to a SOAP message analysis section 703. The SOAP message analysis section 703 analyzes the SOAP data. In addition, the SOAP communication section 701 transmits the SOAP data that has been generated by a SOAP message generation section 702 to the software distribution server 111 via the network I/F 307 (or network I/F 405). A monitor control section 704 updates image forming apparatus information that is accumulated in an information accumulation section 706 and acquires the image forming apparatus information to thereby perform schedule management. The image forming apparatus information processing section 705 accumulates firmware and software information that have been collected from the image forming apparatus by the present monitoring device in the information accumulation section 706 in accordance with the schedule managed by the monitor control section 704. This accumulation is performed when needed. The data accumulated in the information accumulation section 706 is directly passed to a SOAP message generation section 702 via the image forming apparatus information processing section 705, which is then transmitted to the software distribution server 111. After the interpretation and processing of the data in the image forming apparatus information processing section 705, the data may be passed to the SOAP message generation section 702 to thereby transmit it to the software distribution server 111.

Figure 8:
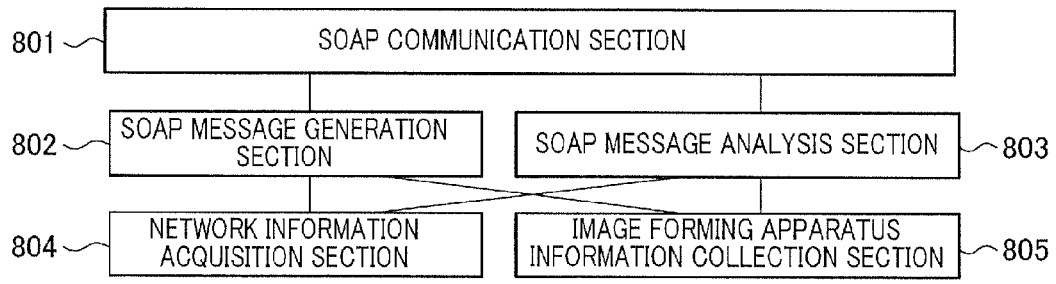
FIG. 8 is a view showing a software configuration of a portion involved in software distribution of the image forming apparatuses 115, 116, 120, 121, 124, 125, 126, 127, and 131.

FIG. 8 is a view showing a software configuration of a portion involved in software distribution of the image forming apparatuses 115, 116, 120, 121, 124, 125, 126, 127, and 131. A SOAP communication section 801 passes SOAP data, which has been received by the software distribution server 111 via the network I/F 505, to a SOAP message analysis section 803. The SOAP message analysis section 803 analyzes the SOAP data. In addition, the SOAP communication section 801 transmits the SOAP data that has been generated by a SOAP message generation section 802 to the software distribution server 111 via the network I/F 505. A network information acquisition section 804 automatically acquires an Internet Protocol (IP) address, Domain Name System server, and gateway address in a Dynamic Host Configuration Protocol (DHCP) environment. The network information acquisition section 804 acquires such information, when the network information that has been input from the operation section 510 and stored in the HDD 509 is present. The image forming apparatus information collection section 805 acquires information such as firmware or software to be held internally on the basis of the schedule set in the present image forming apparatus or the instruction from the software distribution server 111. The acquired data is directly passed to the SOAP message generation section 802, which is then transmitted to the software distribution server 111. After the accumulation, interpretation and processing of the data in an image forming apparatus information collection section 805, the data may be passed to the SOAP message generation section 802 to thereby transmit it to the software distribution server 111.

<Memory Map>

Figure 9:
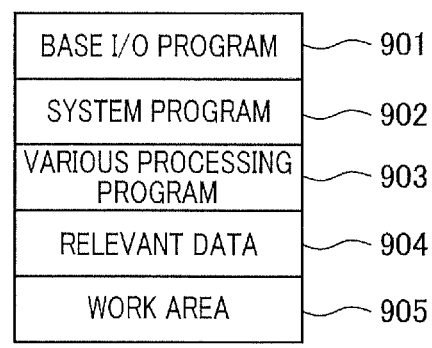
FIG. 9 is a view showing a memory map structure used for the software distribution server 111, the monitoring devices 117, 122, and 123, and the image forming apparatuses 115, 116, 120, 121, 124, 125, 126, 127, and 131.

FIG. 9 is a view showing a memory map structure used for the software distribution server 111, the monitoring devices 117, 122, and 123, and the image forming apparatuses 115, 116, 120, 121, 124, 125, 126, 127, and 131. In the present embodiment, a program is loaded on the RAM 204 in the software distribution server 111, on the ROM 303 or the flash ROM 403 in each monitoring device, and on the RAM 508 in each image forming apparatus so as to configure a memory map.

As shown in FIG. 9, each memory is configured by an area for a basic I/O program 901, an area for a system program 902, an area for various processing programs 903, an area 904 which stores associated data, and a working area 905.

A base I/O program that performs both input and output on each device is stored in the area for a basic I/O program 901.

A system program that provides an operating environment for each process program is stored in the area for a system program 902. Various processing programs such as a program for executing the EULA integration of the present embodiment are stored in the area for various processing programs 903. The data involved in performing each process is stored in the area 904 which stores associated data. The working area 905 is used as a working area for executing various programs. In addition, when any of the areas become insufficient due to a restriction on memory capacity, the first HDD 205 or the second HDD 206 can also be used as a part of the area of the RAM 204, the HDD 304 can be used as a part of the ROM 303, and the HDD 509 can be used as a part of the RAM 508.

Figure 10:
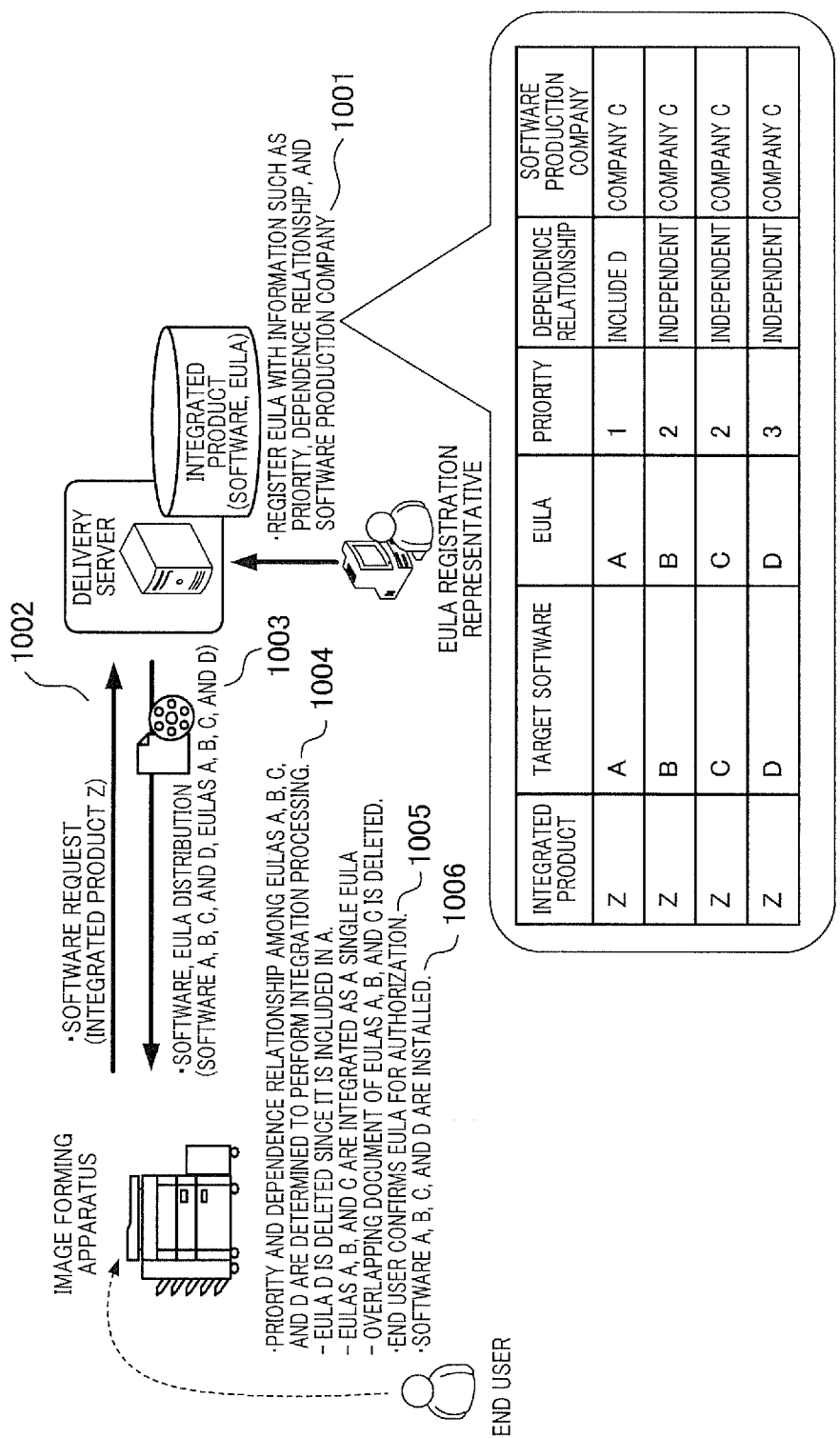
FIG. 10 is a view for illustrating a procedure in which the image forming apparatuses 115, 116, 120, 121, 124, 125, 126, 127, and 131 request software distribution to the software distribution server 111.

The present invention provides a technique for integrating a plurality of EULAs to be authorized into one EULA so as to authorize it all together when software, i.e., an integrated product, is installed on the image forming apparatus. Accordingly, a description will first be given of a procedure in which the image forming apparatus requests software distribution to the software distribution server. FIG. 10 is a view for illustrating a procedure in which the image forming apparatuses 115, 116, 120, 121, 124, 125, 126, 127, and 131 request software distribution to the software distribution server 111. Hereinafter, a detailed description will be given along the sequence shown in FIG. 10.

First, a description is made on the assumption that an EULA is registered with information such as priority, dependency relationship with other EULAs, and a software production company when software to be distributed and an EULA are registered on the software distribution server 111 (step S1001).

Next, the image forming apparatuses 115, 116, 120, 121, 124, 125, 126, 127, and 131 notify the software distribution server 111 (step S1002) about a software request. At this time, an integrated product Z is specified.

Next, a distribution server 111 transmits software (A, B, C, and D) which is the contents of the integrated product Z and the EULAs (A, B, C, and D) to the image forming apparatuses 115, 116, 120, 121, 124, 125, 126, 127, and 131 (step S1003).

Next, the image forming apparatuses 115, 116, 120, 121, 124, 125, 126, 127, and 131 perform integration processing of EULAs with reference to priority and dependency relationship of the EULAs (A, B, C, and D) (step S1004). Here, the EULA (D) is deleted since it is included in the EULA (A), and the EULAs (A, B, and C) are integrated as one EULA. At that time, a documents of the EULAs (A, B, and C) which overlap are deleted.

Next, the EULA that has been integrated in step S1004 is authorized (step S1005).

Finally, the image forming apparatuses 115, 116, 120, 121, 124, 125, 126, 127, and 131 installs software (A, B, C, and D) (step S1006). When the EULA has not been authorized in step S1005, all software is deleted.

Figure 11:
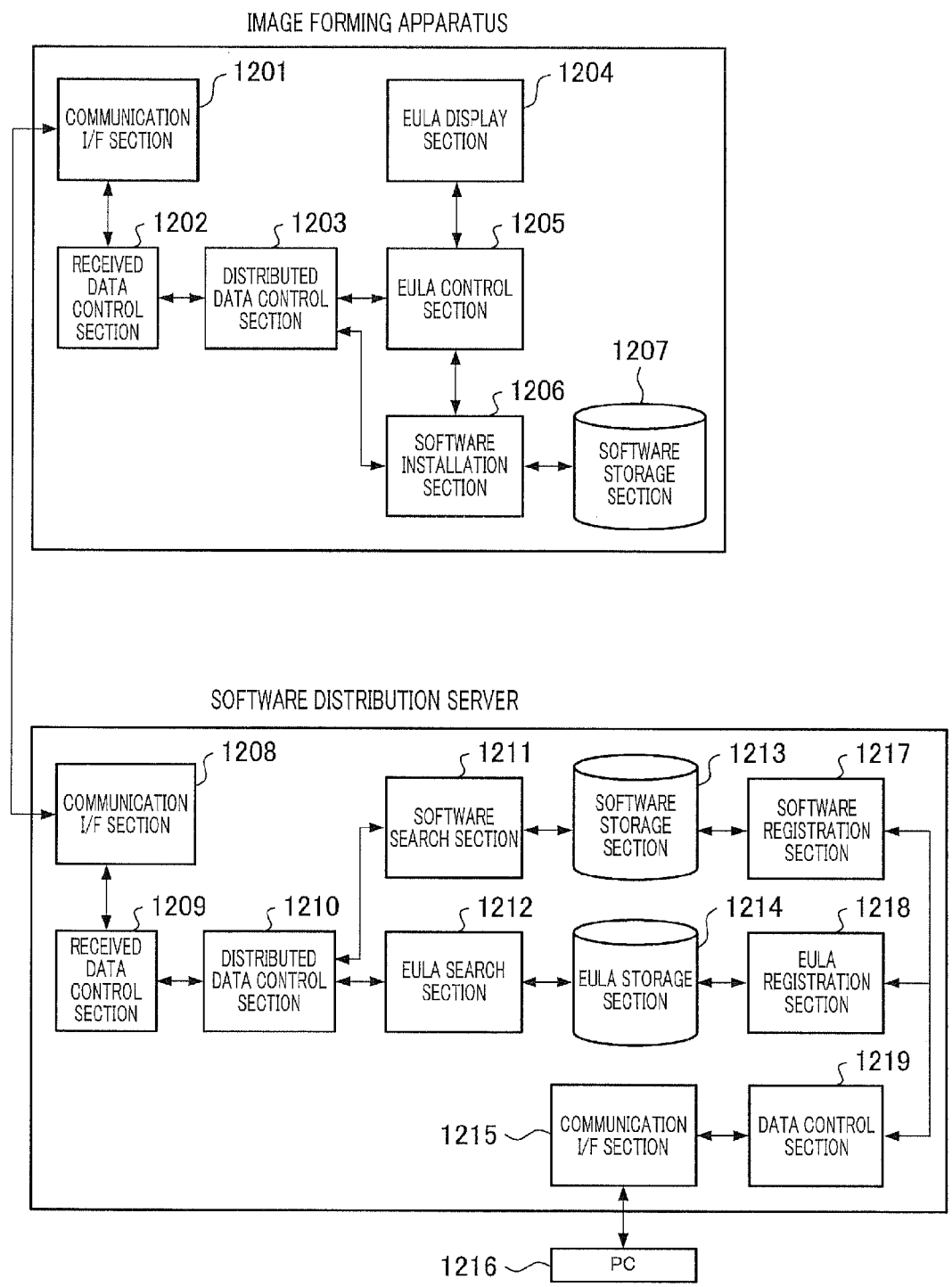
FIG. 11 is a view for illustrating an EULA information table.

Next, the information table of the EULA to be registered in the software distribution server 111 will be described. FIG. 11 is a view for illustrating the EULA information table. The EULA information table includes an integrated product field 1101, a software field 1102, an EULA ID field 1103, a priority field 1104, a dependency relationship field 1105, and a software production company field 1106.

The name (type) of an integrated product is indicated in the integrated product field 1101. The name of software to be distributed is indicated in the software field 1102. An ID for identifying EULA is indicated in the EULA ID field 1103. EULA priority information is indicated in the priority field 1104. EULA dependency relationship information is indicated in the dependency relationship field 1105. The name of the software producer, for example, the name of the software production company is indicated in the software production company field 1106.

Figure 12:
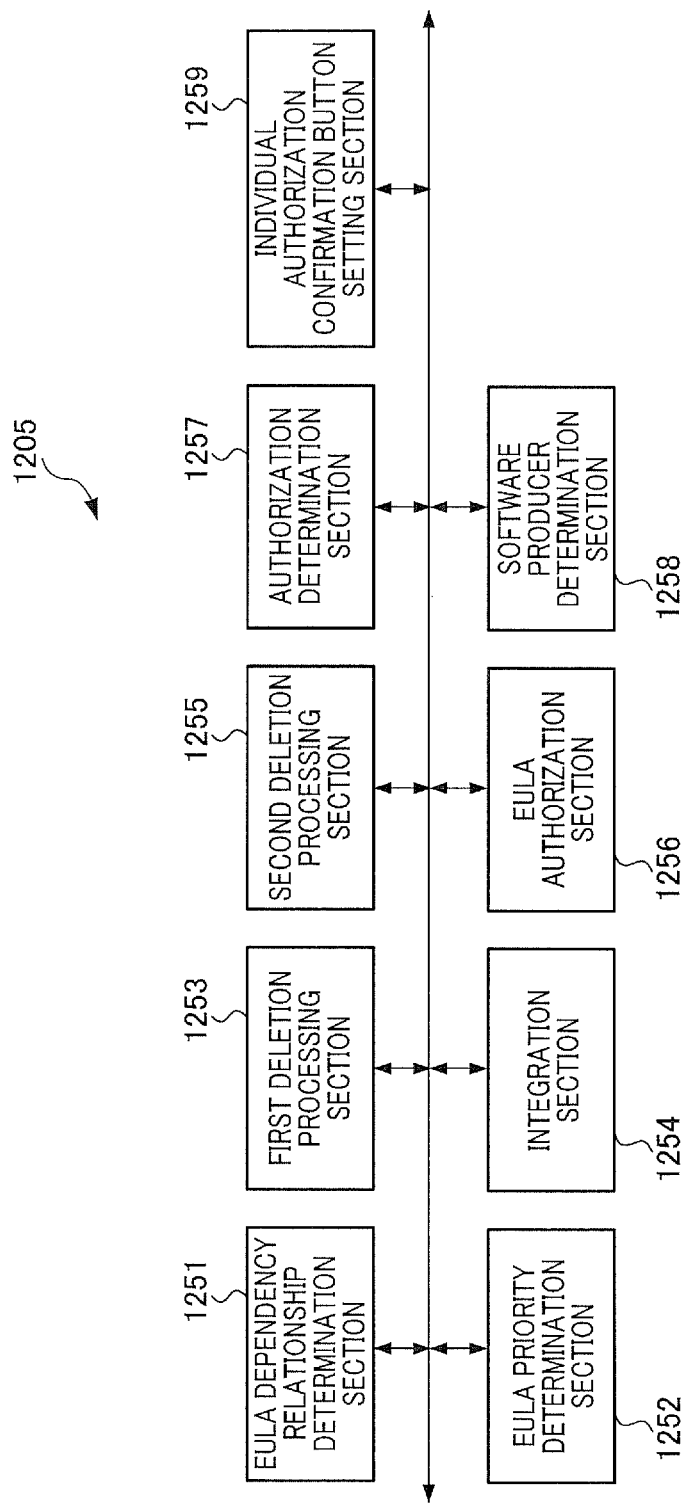
FIG. 12-A is a block diagram illustrating a functional configuration of the software distribution server 111 and the image forming apparatuses 115, 116, 120, 121, 124, 125, 126, 127, and 131.

Next, the function of the software distribution server and the image forming apparatus according to the present embodiment will be described. FIG. 12A is a block diagram illustrating the functional configuration of the software distribution server 111 and the image forming apparatuses 115, 116, 120, 121, 124, 125, 126, 127, and 131.

First, the image forming apparatuses 115, 116, 120, 121, 124, 125, 126, 127, and 131 include a communication I/F section 1201, a received data control section 1202, and a distributed data control section 1203. The image forming apparatuses 115, 116, 120, 121, 124, 125, 126, 127, and 131 further include an EULA display section (contract document display section) 1204, an EULA control section (contract document control section) 1205, a software installation section (program installation unit) 1206, and a software storage section 1207.

The communication I/F section 1201 controls the connection with a network to transmit data to and receive data from the software distribution server 111. The communication I/F section 1201 can realize the functions thereof with the CPU 506 and the network I/F 505 shown in FIG. 5, for example.

The received data control section 1202 controls data that has been received from the software distribution server 111 via the communication I/F section 1201. The received data control section 1202 can realize the functions thereof by executing the EULA integration program (contract document integration program) by the CPU 506 shown in FIG. 5, for example.

The distributed data control section 1203 controls data to be distributed. Here, the term "distributed data" refers to a request notification of an integrated product or software to be transmitted to the software distribution server 111. The distributed data control section 1203 can realize the functions thereof by executing the EULA integration program by the CPU 506 shown in FIG. 5, for example.

The EULA display section 1204 displays EULA. The EULA display section 1204 can realize the functions thereof with the CPU 506 and the display section 511 shown in FIG. 5, for example.

The EULA control section 1205 controls the integration processing and authorization status of EULA (to be detailed later). The EULA control section 1205 can realize the functions thereof by executing the EULA integration program by the CPU 506 shown in FIG. 5, for example.

The software installation section 1206 installs software that has been distributed from the software distribution server 111. The software installation section 1206 can realize the functions thereof by executing the EULA integration program by the CPU 506 shown in FIG. 5, for example.

The software storage section 1207 stores installed software. The software storage section 1207 is a database and can realize the functions thereof with the CPU 506 and the HDD 509 shown in FIG. 5, for example.

On the other hand, the software distribution server 111 includes a communication I/F section 1208 (distribution unit), a received data control section 1209, a distribution data control section 1210, a software search section 1211, and an EULA search section (contract document search section) 1212. The software distribution server 111 further includes a software storage section 1213, an EULA storage section 1214, a communication I/F section 1215, a software registration section 1217, an EULA registration section (contract document registration section) 1218, and a data control section 1219.

The communication I/F section 1208 controls the connection with a network to transmit data to and receive data from the image forming apparatuses 115, 116, 120, 121, 124, 125, 126, 127, and 131. The communication I/F section 1208 can realize the functions thereof with the first CPU 201 or the second CPU 202 and the network I/F 209, and the like shown in FIG. 2, for example.

The received data control section 1209 controls data that has been received from the image forming apparatuses 115, 116, 120, 121, 124, 125, 126, 127, and 131 via the communication I/F section 1208. The received data control section 1209 can realize the functions thereof by executing a predetermined program by the first CPU 201 or the second CPU 202 shown in FIG. 2, for example.

The distributed data control section 1210 controls data to be distributed. Here, the term "distributed data" refers to data such as software and EULAs. More specifically, the distribution data control section 1210 integrates software to be distributed and its associated EULA into a single data. The distribution data control section 1210 can realize the functions thereof by executing a predetermined program by the first CPU 201 or the second CPU 202 shown in FIG. 2, for example.

The software search section 1211 searches for software to be distributed. The software search section 1211 can realize the functions thereof by executing a predetermined program by the first CPU 201 or the second CPU 202 shown in FIG. 2, for example.

The EULA search section 1212 searches for the EULA to be distributed. More specifically, the EULA search section 1212 searches for the EULA corresponding to software to be distributed that has been searched for by the software search section 1211. The EULA search section 1212 can realize the functions thereof by executing a predetermined program by the first CPU 201 or the second CPU 202 shown in FIG. 2, for example.

The software storage section 1213 stores software to be distributed. The software storage section 1213 is a database and can realize the functions thereof with the first CPU 201 or the second CPU 202 and the first HDD 205 or the second HDD 206 shown in FIG. 2, for example.

The EULA storage section (contract document storage section) 1214 stores EULAs to be distributed. The EULA storage section 1214 is a database and can realize the functions thereof with the first CPU 201 or the second CPU 202 and the first HDD 205 or the second HDD 206 shown in FIG. 2, for example.

The communication I/F section 1215 controls connection with a PC 1216 that serves as an external device so as to download software and EULAs, which are registered in the software distribution server 111, from the PC 1216. Note that the PC 1216 corresponds to the PCs 104 and 109 shown in FIG. 1. The communication I/F section 1215 can realize the functions thereof with the first CPU 201 or the second CPU 202 and the external device I/F 210 shown in FIG. 2, for example.

The software registration section 1217 performs registration processing of software to be distributed to the software storage section 1213. The software registration section 1217 can realize the functions thereof by executing a predetermined program by the first CPU 201 or the second CPU 202 shown in FIG. 2, for example.

The EULA registration section 1218 performs registration processing of EULAs to be distributed to the EULA storage section 1214. EULAs to be registered are configured as the EULA information table shown in FIG. 11, for example. More specifically, by performing registration processing by the EULA registration section 1218, dependency relationship information with other EULAs, EULA priority information, and production company information (producer information) of the corresponding software are also registered. The EULA registration section 1218 can realize the functions thereof by executing a predetermined program by the first CPU 201 or the second CPU 202 shown in FIG. 2, for example.

The data control section 1219 controls data that has been received from the PC 1216 via the communication I/F section 1215.

Next, the details of the EULA control section 1205 shown in FIG. 12A will be described. FIG. 12B is a block diagram illustrating the configuration of the EULA control section 1205. The EULA control section 1205 includes an EULA dependency relationship determination section (contract document dependency relationship determination section) 1251, an EULA priority determination section (contract document priority determination section) 1252, a first deletion processing section 1253, an integration section 1254, and a second deletion processing section 1255. The EULA control section 1205 further includes an EULA authorization section (contract document authorization section) 1256 and an authorization determination section 1257. The EULA control section 1205 further includes a software producer determination section 1258 and an individual authorization confirmation button setting section 1259.

The EULA dependency relationship determination section 1251 determines from the contract document dependency relationship information included in the received data whether or not there is any EULA which is included in another EULA of a plurality of EULAs. The EULA priority determination section 1252 determines the priority order among a plurality of contract documents from the contract document priority information included in the received data. Also, the first deletion processing section 1253 deletes an EULA that has been determined to be included in another EULA by the EULA dependency relationship determination section 1251. The first deletion processing section 1253 deletes the EULA that has been determined to be of the least priority by the EULA priority determination section 1252. The integration section 1254 integrates the remaining EULAs after the processing performed by the first deletion processing section 1253 is complete. The second deletion processing section 1255 extracts overlapping portions from the EULA that has been integrated by the integration section 1254 and deletes an unwanted part so as not to overlap. The EULA authorization section 1256 authorizes the EULA that has been subjected to the processing performed by the second deletion processing section 1255. The authorization determination section 1257 determines whether or not the EULA has been authorized by the EULA authorization section 1256.

The software producer determination section 1258 determines whether or not a plurality of software included in the received data are produced by the same production company. The individual authorization confirmation button setting section 1259 integrates EULAs for each software production company that has been determined by the software producer determination section 1258 so as to set an authorization confirmation button corresponding to the software production company. When the authorization confirmation button has been set, the second deletion processing section 1255 extracts an overlapping portion for each EULA corresponding to the authorization confirmation button and deletes an unwanted part so as not to overlap. The EULA authorization section 1256 authorizes each EULA corresponding to the authorization confirmation button after the processing performed by the second deletion processing section 1255 is complete.

<EULA Integration Processing Performed by Image Forming Apparatus>

Figure 13:
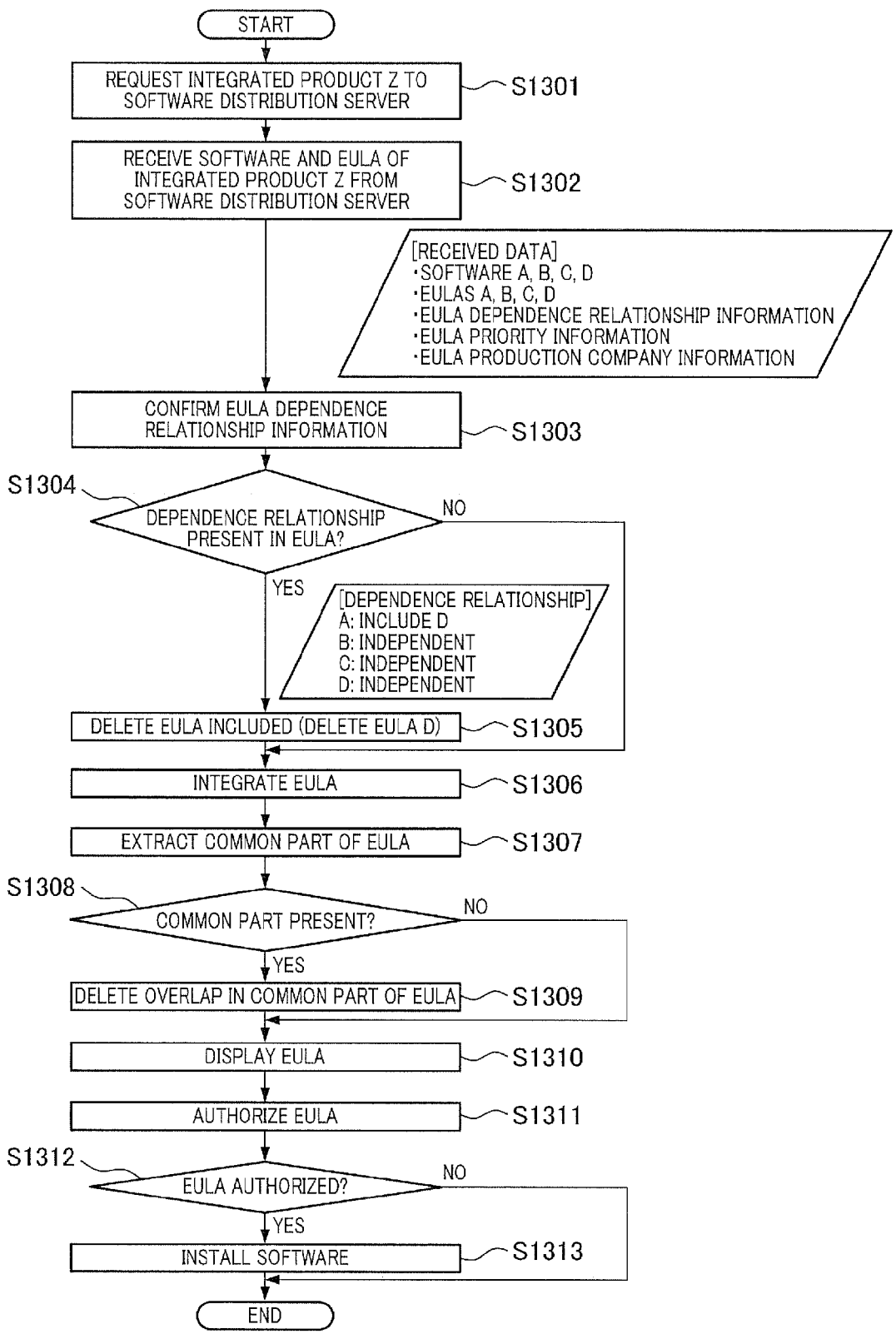
FIG. 13 is a flowchart illustrating the procedure of EULA integration processing performed by the image forming apparatuses 115, 116, 120, 121, 124, 125, 126, 127, and 131.

Next, EULA integration processing performed by the image forming apparatus according to the present embodiment will be described. FIG. 13 is a flowchart illustrating the procedure of EULA integration processing performed by the image forming apparatuses 115, 116, 120, 121, 124, 125, 126, 127, and 131. Here, each image forming apparatus determines the EULA dependency relationship so as to integrate the EULAs.

First, in the flowchart shown in FIG. 13, the integrated product Z is requested to provide the software distribution server 111 (step S1301). More specifically, the distributed data control section 1203 shown in FIG. 12A requests distribution of the integrated product Z to the software distribution server 111, for example.

Next, the software and EULAs of the integrated product Z are received from the software distribution server 111 (step S1302). Here, the received data control section 1202 shown in FIG. 12A receives the software and EULAs of the integrated product Z that have been transmitted from the software distribution server 111. Examples of the received data to be received by the received data control section 1202 include the following:

(a) software (A, B, C, and D)
(b) EULAs (A, B, C, and D)
(c) EULA dependency relationship information
(d) EULA priority information
(e) EULA production company information Next, EULA dependency relationship information is confirmed (step S1303). Here, the EULA dependency relationship determination section 1251 shown in FIG. 12B confirms EULA dependency relationship information.

Next, it is determined whether or not there is a dependency relationship among the EULAs (step S1304). In this processing, the determination of the presence or absence of the dependency relationship confirmed by the EULA dependency relationship determination section 1251 shown in FIG. 12B depends on whether or not there is any EULA to be included in another EULA of a plurality of EULAs. For example, when the EULA (A) contains the EULA (D) and the EULA (B), EULA (C), and EULA (D) are independent, it is determined that there is a dependency relationship. On the other hand, when all EULAs are independent, it is determined that there is no dependency relationship.

When there is no dependency relationship among EULAs in step S1304 (step S1304: No), the process shifts to step S1306. On the other hand, when there is a dependency relationship among EULAs in step S1304 (step S1304: Yes), the included EULA is deleted (step S1305: first deletion processing step). The processing is executed by the first deletion processing section 1253 shown in FIG. 12B. In the flowchart shown in FIG. 13, the EULA (D) is deleted because the EULA (D) is included in the EULA (A).

Next, the EULAs are integrated (step S1306). The processing is executed by the integration section 1254 shown in FIG. 12B. Since the EULA (D) has been deleted in step S1305, the EULAs (A, B, and C) are integrated as a single document.

Next, the common part among the EULAs is extracted (step S1307). The processing is executed by the second deletion processing section 1255 shown in FIG. 12B. Here, for example, the common part among the EULAs (A, B, and C) is extracted. Note that the common part is a section where the same description is used in each EULA.

Next, it is determined whether or not there is a common part (step S1308). The processing is executed by the second deletion processing section 1255 shown in FIG. 12B. Here, for example, it is determined whether or not the common part is present among the EULAs (A, B, and C). When there is no common part (step S1308: No), the process shifts to step S1310. On the other hand, when there is a common part (step S1308: Yes), the overlap of the common part among the EULAs is deleted (step S1309: second deletion processing). The processing is also executed by the second deletion processing section 1255. For example, when the common part has been found in the EULAs (A, B, and C), unwanted part is deleted so as not to overlap.

Next, the EULA is displayed (step S1310). Here, the EULA display section 1204 shown in FIG. 12A displays the integrated EULA.

Next, the EULA is authorized (step S1311). Here, the EULA authorization section 1256 shown in FIG. 12B authorizes the EULA that has been displayed in step S1310.

Next, it is determined whether or not the EULA has been authorized (step S1312). Here, the authorization determination section 1257 shown in FIG. 12B determines whether or not the relevant EULA has been authorized in step S1311. When the EULA has not been authorized (step S1312: No), the process is ended. On the other hand, when the EULA has been authorized (step S1312: Yes), software is installed (step S1313). More specifically, the software installation section 1206 shown in FIG. 12A installs software corresponding to the authorized EULA.

Figure 14:
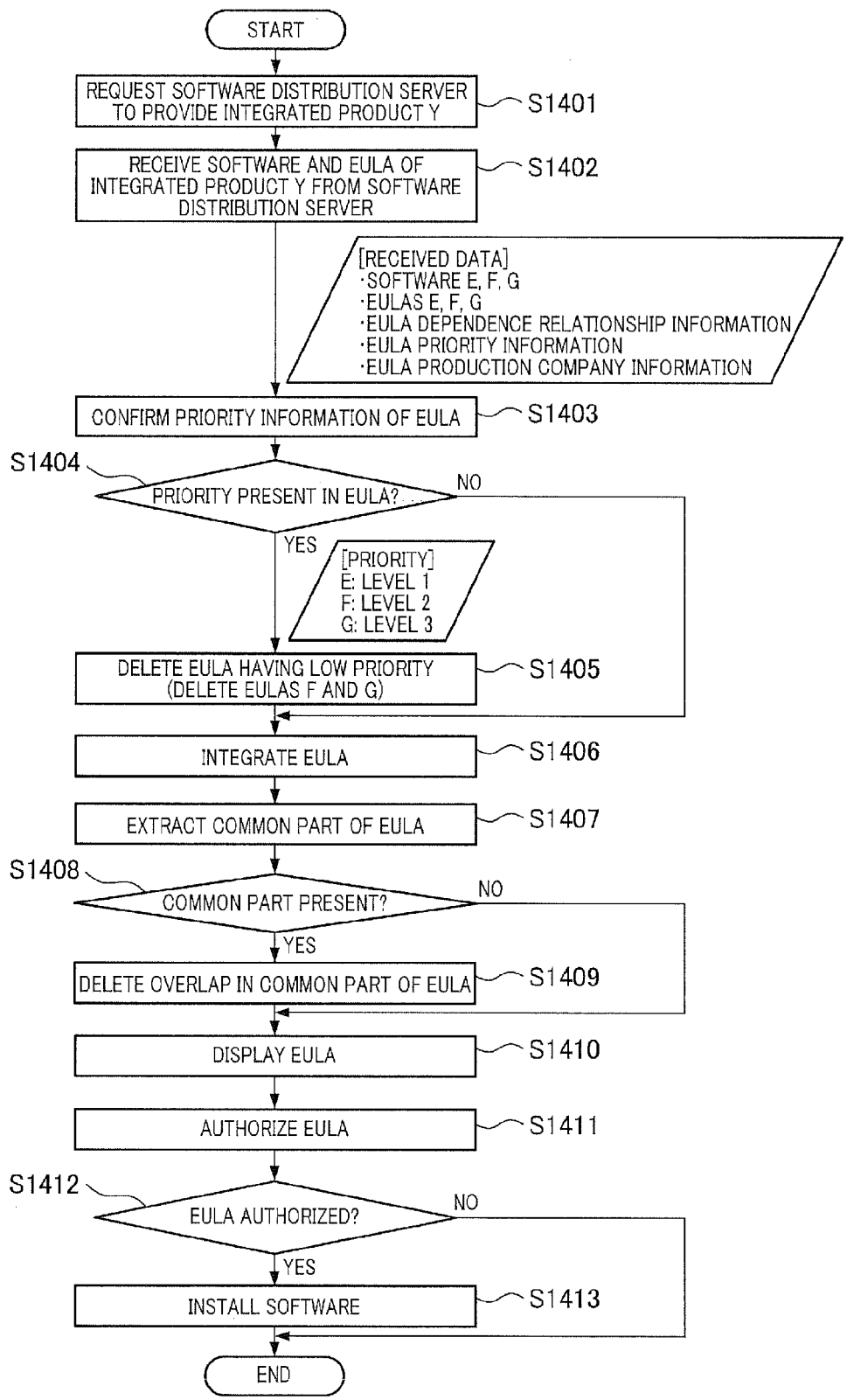
FIG. 14 is a flowchart illustrating the procedure of another EULA integration processing performed by the image forming apparatuses 115, 116, 120, 121, 124, 125, 126, 127, and 131.

Next, another example of processing performed by the image forming apparatus according to the present embodiment will be described. FIG. 14 is a flowchart illustrating the procedure of another EULA integration processing performed by the image forming apparatuses 115, 116, 120, 121, 124, 125, 126, 127, and 131. Here, each image forming apparatus determines the priority of the EULAs so as to integrate the EULAs.

First, in the flowchart shown in FIG. 13, the software distribution server 111 is requested to provide the integrated product (step S1401). More specifically, the distributed data control section 1203 shown in FIG. 12A requests distribution of, for example, the integrated product Y to the software distribution server 111.

Next, the software and EULAs of the integrated product Y are received from the software distribution server 111 (step S1402). Here, the received data control section 1202 shown in FIG. 12A receives the software and EULAs of the integrated product Y that have been transmitted from the software distribution server 111. Examples of the received data to be received by the received data control section 1202 include the following:

(a) software (E, F, and G)
(b) EULAs (E, F, and G)
(c) EULA dependency relationship information
(d) EULA priority information
(e) EULA production company information Next, EULA priority information is confirmed (step S1403). Here, the EULA priority determination section 1252 shown in FIG. 12B confirms EULA priority information.

Next, it is determined whether or not there is a priority among the EULAs (step S1404). The processing is also executed by the EULA priority determination section 1252 shown in FIG. 12B. Determination of the priority depends on priority information attached to each EULA. Here, for example, when the EULA (E) is level 1, the EULA (F) is level 3, and the EULA (G) is level 3, there is a priority among the EULAs. It is determined that the EULA (E) with the priority of level 1 has the highest priority. On the other hand, when the priority of all EULAs lies in the same level, it is determined that there is no priority among the EULAs.

When there is no priority among the EULAs in step S1404 (step S1404: No), the process shifts to step S1406. On the other hand, when there is a priority among the EULAs in the step S1404 (step S1404: Yes), the EULA with a lower priority is deleted (step S1405: first deletion processing). The processing is executed by the first deletion processing section 1253 shown in FIG. 12B. In the example of FIG. 14, both EULA (F) and EULA (G) have a lower priority of level 3, so that both of them are deleted.

Next, the EULAs are integrated (step S1406). The processing is executed by the integration section 1254 shown in FIG. 12B. In FIG. 14, the remaining EULA is the EULA (E) only since the EULA (F) and EULA (G) have been deleted in S1405. However, when a plurality of EULAs with the same priority are present, a plurality of the EULAs are integrated.

Next, the common part among the EULAs is extracted (step S1407). The processing is executed by the second deletion processing section 1255 shown in FIG. 12B. Note that the common part is a section where the same description is used for each EULA.

Next, it is determined whether or not there is a common part (step S1408). The processing is also executed by the second deletion processing section 1255 shown in FIG. 12B. For example, it is determined whether or not the common part is present among the EULAs. When there is no common part (step S1408: No), the process shifts to step S1410. On the other hand, when there is a common part (step S1408: Yes), the overlap of the common part among the EULAs is deleted (step S1409: second deletion processing). The processing is also executed by the second deletion processing section 1255. For example, when the common part has been found in the EULAs, unwanted part is deleted so as not to overlap.

Next, the EULA is displayed (step S1410). Here, the EULA display section 1204 shown in FIG. 12A displays the integrated EULA.

Next, the EULA is authorized (step S1411). Here, the EULA authorization section 1256 shown in FIG. 12B authorizes the EULA that has been displayed in step S1410.

Next, it is determined whether or not the EULA has been authorized (step S1412). Here, the authorization determination section 1257 shown in FIG. 12B determines whether or not the relevant EULA has been authorized in step S1411. When the EULA has not been authorized (step S1412: No), the process is ended. On the other hand, when the EULA has been authorized (step S1412: Yes), software is installed (step S1413). More specifically, the software installation section 1206 shown in FIG. 12A installs software corresponding to the authorized EULA.

Figure 15:
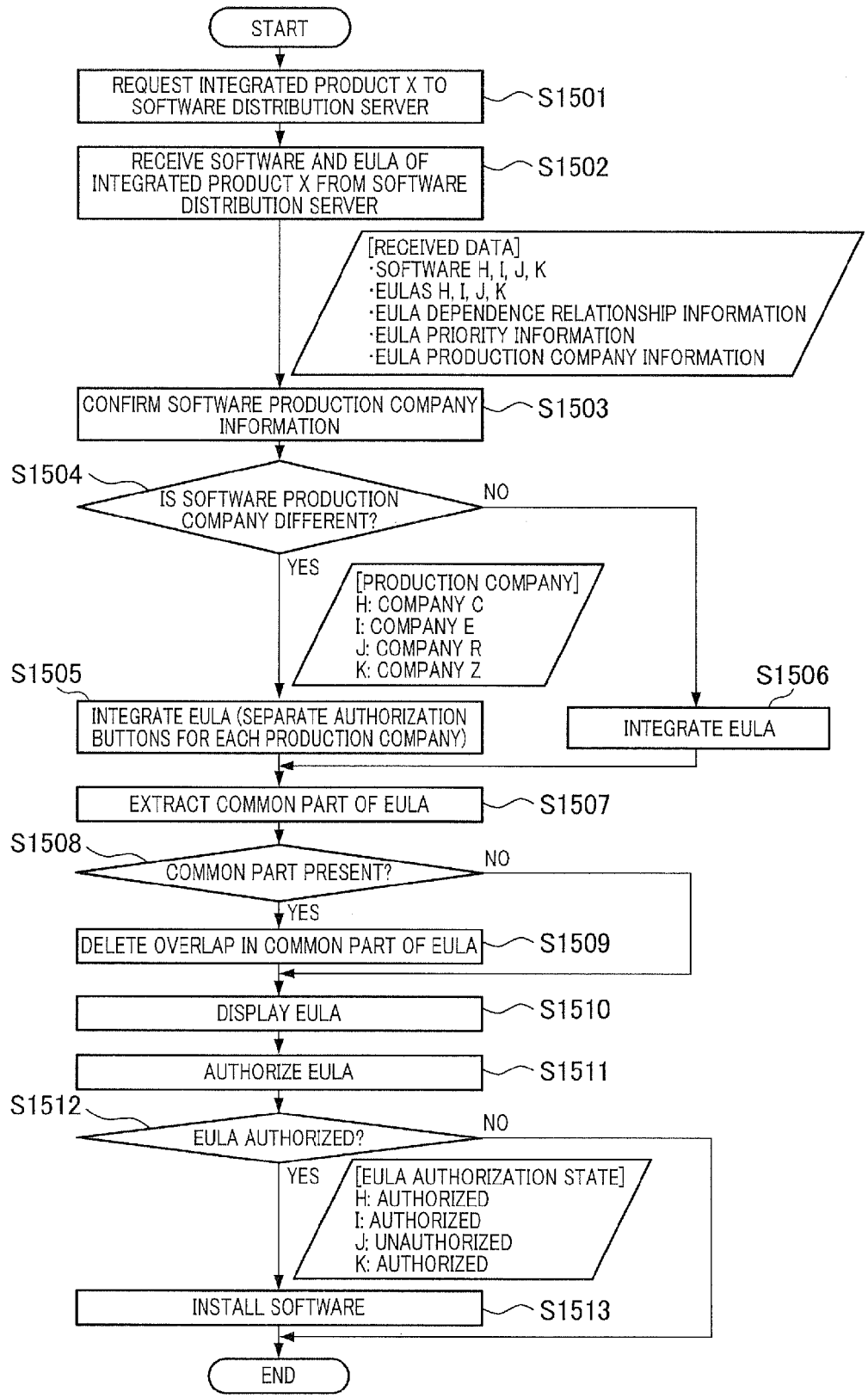
FIG. 15 is a flowchart illustrating the procedure of another EULA integration processing performed by the image forming apparatuses 115, 116, 120, 121, 124, 125, 126, 127, and 131.

Next, another processing performed by the image forming apparatus according to the present embodiment will be described. FIG. 15 is a flowchart illustrating the procedure of another EULA integration processing performed by the image forming apparatuses 115, 116, 120, 121, 124, 125, 126, 127, and 131. Here, each image forming apparatus determines the software production companies so as to integrate the EULAs for each software production company.

First, in the flowchart shown in FIG. 15, the software distribution server 111 is requested to provide the integrated product X (step S1501). More specifically, the distributed data control section 1203 shown in FIG. 12A requests distribution of, for example, the integrated product X to the software distribution server 111.

Next, the software and EULAs of the integrated product X are received from the software distribution server 111 (step S1502). Here, the received data control section 1202 shown in FIG. 12A receives the software and EULAs of the integrated product X that have been transmitted from the software distribution server 111. Examples of the received data to be received by the received data control section 1202 include the following:

(a) software (H, I, J, and K)
(b) EULAs (H, I, J, and K)
(c) EULA dependency relationship information
(d) EULA priority information
(e) EULA production company information Next, software production company information is confirmed (step S1503). In this processing, the software producer determination section 1258 shown in FIG. 12B confirms a plurality of software production company information included in the received data.

Next, it is determined whether or not the production companies are different for each software (step S1504). The processing is also executed by the software producer determination section 1258 shown in FIG. 12B. For example, the software (H), the software (I), the software (J), and the software (K) are produced by company C, company E, company R, and company Z, respectively, it is determined that the production companies are different.

When the production companies are different for each software in step S1504 (step S1504: Yes), the EULAs are integrated for each software production company (step S1505). More specifically, the individual authorization confirmation button setting section 1259 shown in FIG. 12B integrates the EULAs for each software production company that has been determined in step S1504, and sets an authorization confirmation button corresponding to the software production company. On the other hand, when the software production companies are the same in step S1504 (step S1504: No), the EULAs are integrated as is (step S1506). When the software production companies are the same, the EULAs are integrated as is. Consequently, only one authorization confirmation button is set. The processing is also executed by the individual authorization confirmation button setting section 1259 shown in FIG. 12B.

Next, the common part among the EULAs is extracted (step S1507). The processing is executed by the second deletion processing section 1255 shown in FIG. 12B. Note that the common part is a section where the same description is used for each EULA.

Next, it is determined whether or not there is a common part (step S1508). The processing is also executed by the second deletion processing section 1255 shown in FIG. 12B. For example, it is determined whether or not a common part is present among the EULAs. When there is no common part (step S1508: No), the process shifts to step S1510. On the other hand, when there is a common part (step S1508: Yes), the overlap of the common part among the EULAs is deleted (step S1509: second deletion processing). The processing is also executed by the second deletion processing section 1255. For example, when the common part has been found in the EULAs, unwanted part is deleted so as not to overlap.

Next, the EULA is displayed (step S1510). Here, the EULA display section 1204 shown in FIG. 12A displays the integrated EULA.

Next, the EULA is authorized (step S1511). Here, the EULA authorization section 1256 shown in FIG. 12B authorizes the EULA that has been displayed in step S1510. In this example, note that since the authorization confirmation buttons are set, authorization by the EULA authorization section 1256 is performed for each authorization confirmation button.

Next, it is determined whether or not the EULA has been authorized (step S1512). Here, the authorization determination section 1257 shown in FIG. 12B determines whether or not the relevant EULA has been authorized for each authorization confirmation button. Here, for example, when the EULA (H), the EULA (I), and the EULA (K) have been authorized and the EULA (J) has not been authorized, only the software of the EULA (J) is not installed in the subsequent step. It is preferred that the authorization results are displayed on the EULA display section 1204 such that the state of whether or not they have been actually authorized is readily apparent when the authorization confirmation button provided for each software production company is observed.

When the EULA has not been authorized in step S1512 (step S1512: No), the process is ended. More specifically, the software corresponding to the unauthorized EULA is not installed. On the other hand, when the EULA has been authorized (step S1512: Yes), the software is installed (step S1513). More specifically, the software installation section 1206 shown in FIG. 12A installs the software corresponding to the authorized EULA.

Figure 16:
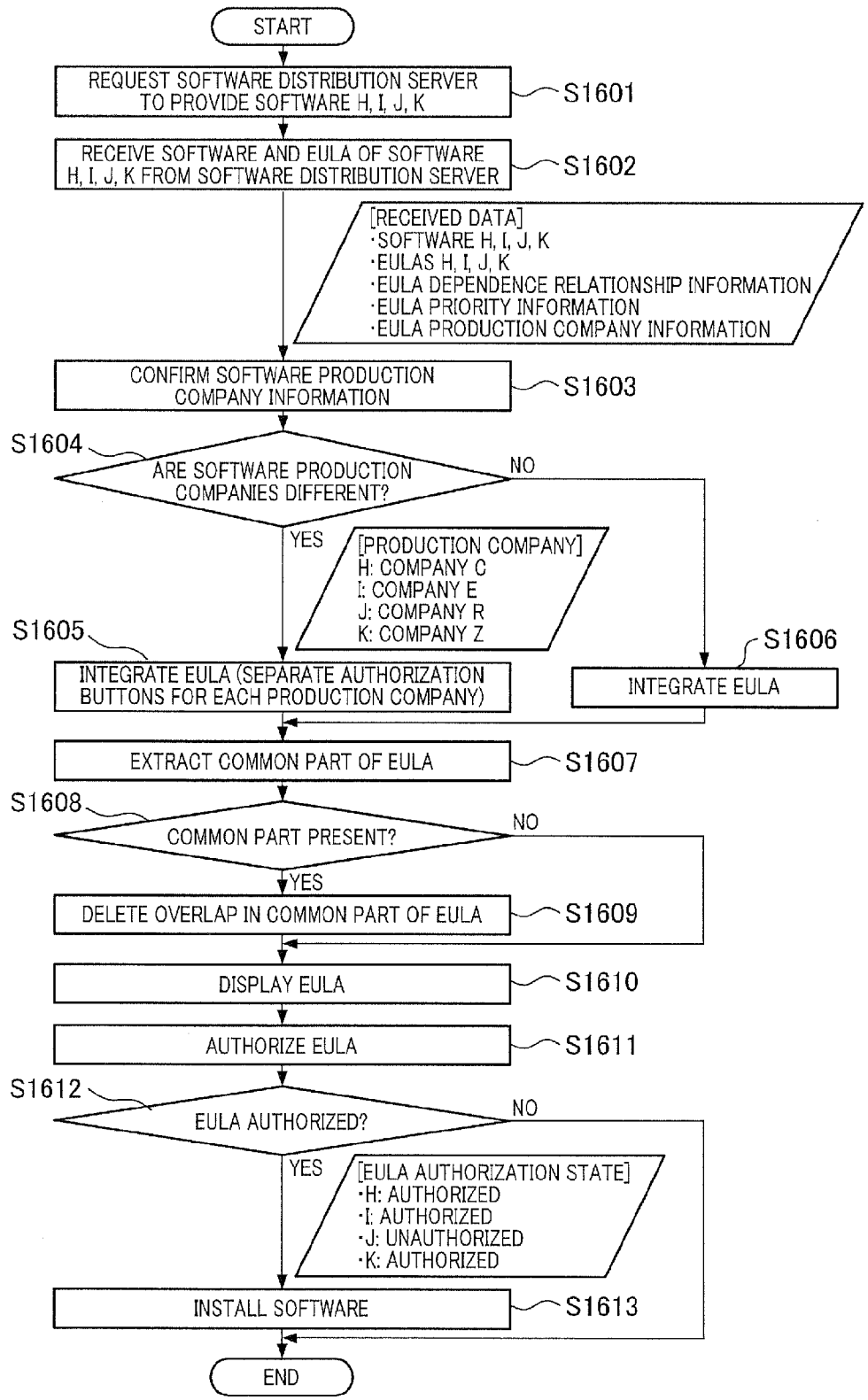
FIG. 16 is a flowchart illustrating the procedure of another EULA integration processing performed by the image forming apparatuses 115, 116, 120, 121, 124, 125, 126, 127, and 131.

Next, another processing performed by the image forming apparatus according to the present embodiment will be described. FIG. 16 is a flowchart illustrating the procedure of another EULA integration processing performed by the image forming apparatuses 115, 116, 120, 121, 124, 125, 126, 127, and 131. Also in this example, each image forming apparatus determines the software production companies so as to integrate the EULAs for each software production company. This differs from the example described on the basis of FIG. 15 in that each image forming apparatus does not request the software distribution server 111 to provide an integrated product, but directly requests software.

First, in the flowchart shown in FIG. 16, the software distribution server 111 is requested to provide software (step S1601). More specifically, the distributed data control section 1203 shown in FIG. 12A requests the software distribution server 111 to distribute the software (H, I, J, and K).

Next, the software and EULAs are received from the software distribution server 111 (step S1602). Here, the received data control section 1202 shown in FIG. 12A receives the software (H, I, J, and K) and the EULA (H, I, J, and K) corresponding thereto that have been transmitted from the software distribution server 111. Examples of the received data to be received by the received data control section 1202 include the following:

(a) software (H, I, J, and K)
(b) EULAs (H, I, J, and K)
(c) EULA dependency relationship information
(d) EULA priority information
(e) EULA production company information Next, software production company information is confirmed (step S1603). In this processing, the software producer determination section 1258 shown in FIG. 12B confirms a plurality of software production company information included in the received data.

Next, it is determined whether or not the production companies are different for each software (step S1604). The processing is also executed by the software producer determination section 1258 shown in FIG. 12B. For example, the software (H), the software (I), the software (J), and the software (K) are produced by company C, company E, company R, and company Z, respectively, it is determined that the production companies are different.

When the production companies are different for each software in step S1604 (step S1604: Yes), the EULAs are integrated for each software production company (step S1605). More specifically, the individual authorization confirmation button setting section 1259 shown in FIG. 12B integrates the EULAs for each software production company that has been determined in step S1604, and sets an authorization confirmation button corresponding to the software production company. On the other hand, when the software production companies are the same in step S1604 (step S1604: No), the EULAs are integrated as is (step S1606). When the software production companies are the same, the EULAs are integrated as is. Consequently, only one authorization confirmation button is set. The processing is also executed by the individual authorization confirmation button setting section 1259 shown in FIG. 12B.

Next, the common part among the EULAs is extracted (step S1607). The processing is executed by the second deletion processing section 1255 shown in FIG. 12B. Note that the common part is a section where the same description is used for each EULA.

Next, it is determined whether or not there is a common part (step S1608). The processing is also executed by the second deletion processing section 1255 shown in FIG. 12B. For example, it is determined whether or not a common part is present among the EULAs. When there is no common part (step S1608: No), the process shifts to step S1610. On the other hand, when there is a common part (step S1608: Yes), the overlap of the common part among the EULAs is deleted (step S1609: second deletion processing). The processing is also executed by the second deletion processing section 1255. For example, when the common part has been found in the EULAs, unwanted part is deleted so as not to overlap.

Next, the EULA is displayed (step S1610). Here, the EULA display section 1204 shown in FIG. 12A displays the integrated EULA.

Next, the EULA is authorized (step S1611). Here, the EULA authorization section 1256 shown in FIG. 12B authorizes the EULA that has been displayed in step S1610. In this example, note that since the authorization confirmation buttons are already set, the authorization by the EULA authorization section 1256 is performed for each authorization confirmation button.

Next, it is determined whether or not the EULA has been authorized (step S1612). Here, the authorization determination section 1257 shown in FIG. 12B determines whether or not the relevant EULA has been authorized for each authorization confirmation button. Here, for example, when the EULA (H), the EULA (I), and the EULA (K) have been authorized and the EULA (J) has not been authorized, the software of the EULA (J) is not installed in the subsequent step. It is preferred that the authorization results are displayed on the EULA display section 1204 such that the state of whether or not they have actually been authorized can be readily apparent when the authorization confirmation button provided for each software production company is observed.

When the EULA has not been authorized in step S1612 (step S1612: No), the process is ended. More specifically, the software corresponding to the unauthorized EULA is not installed. On the other hand, when the EULA has been authorized (step S1612: Yes), the software is installed (step S1613). More specifically, the software installation section 1206 shown in FIG. 12A installs the software corresponding to the authorized EULA.

As described above, according to the present embodiment, the EULAs can be integrated with only the bare minimum information since the EULA that depends on another EULA and the EULA with a lower priority are deleted and unwanted part is deleted so as not to overlap after the integration of the EULAs. Therefore, an end user can effectively authorize the EULA with the bare minimum information even when a plurality of software is installed. In addition, an authorization field is provided for each production company when the production companies of software to be installed are different. As a result, a contract for each production company can be produced while reducing the complexity of the EULA authorization operation.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-331018, filed Dec. 25, 2008 which is hereby incorporated by reference herein in its entirety.

INDUSTRIAL APPLICABILITY

As described above, the present invention is useful in a software distribution system, in particular, is suitable when it is required that a plurality of software is distributed for carrying out installation.

The invention claimed is:

1. An image forming apparatus, comprising:
at least a processor and memory, which cooperate to function as:
a contract document dependency relationship determination unit configured to determine, when a plurality of programs and a plurality of contract documents that correspond to each of the plurality of programs are acquired from an external apparatus, whether or not there is a contract document included in another contract document among the plurality of contract documents from contract document dependency relationship information included in each of the plurality of contract documents;
a contract document priority determination unit configured to determine a priority order among the plurality of contract documents from contract document priority information included in each of the plurality of contract documents;
a first deletion processing unit configured to delete a contract document that has been determined to be included in another contract document by said contract document dependency relationship determination unit and a contract document that has been determined to be of the least priority by said contract document priority determination unit;
an integration unit configured to integrate remaining contract documents into an integrated contract document after the processing performed by said first deletion processing unit is complete;
a second deletion processing unit configured to extract and delete an overlapping portion from the integrated contract document that has been integrated by said integration unit;
a contract document authorization unit configured to authorize the integrated contract document that has been subjected to the processing performed by said second deletion processing unit; and
a program installation unit configured to install the plurality of programs that correspond to the integrated contract document that has been authorized by said contract document authorization unit.

2. The image forming apparatus according to claim 1, further comprising:
a program producer determination unit configured to determine whether or not there are two or more programs produced by the same producer among the plurality of programs from producer information included in each of the plurality of contract documents,
wherein said second deletion processing unit extracts and deletes an overlapping portion from the integrated contract document in which contract documents produced by the same producer have been integrated, and
wherein the contract document authorization unit authorizes the integrated contract document after the processing performed by said second deletion processing unit is complete.

3. A program distribution system comprising:
a program distribution server; and
an image forming apparatus,
wherein said program distribution server comprises at least a processor and memory, which cooperate to function as:
a program search unit configured to search for a plurality of programs to be distributed;
a contract document search unit configured to search for a plurality of contract documents corresponding to each of the plurality of programs that has been searched by said program search unit;
a first integration unit configured to integrate the plurality of programs that have been searched by said program search unit and the plurality of contract documents that have been searched by said contract document search unit into one data; and
a distribution unit configured to distribute the one data that has been integrated by the first integration unit to said image forming apparatus, and
wherein said image forming apparatus comprises at least a processor and memory, which cooperate to function as:
a contract document dependency relationship determination unit configured to determine, when the one data has been received from the program distribution server, whether or not there is any contract document included in another contract document among the plurality of contract documents from contract document dependency relationship information included in each of the plurality of contract documents in the one data;
a contract document priority determination unit configured to determine a priority order among the plurality of contract documents from contract document priority information included in each of the plurality of contract documents;
a deletion processing unit configured to delete a contract document that has been determined to be included in another contract document by said contract document dependency relationship determination unit and a contract document that has been determined to be of the least priority by said contract document priority determination unit;

a second integration unit configured to integrate remaining contract documents after the processing performed by the deletion processing unit is complete; and a program installation unit configured to install the plurality of programs in the one data according to an authorization based on the one data.

4. A contract document integration method comprising:

a contract document dependency relationship determination step of determining, when a plurality of programs and a plurality of contract documents that correspond to each of the plurality of programs are acquired from an external apparatus, whether or not there is a contract document included in another contract document among the plurality of contract documents from contract document dependency relationship information included in each of the plurality of contract documents;

a contract document priority determination step of determining a priority order among the plurality of contract documents from contract document priority information included in each of the plurality of contract documents;

a first deletion processing step of deleting a contract document that has been determined to be included in another contract document in said contract document dependency relationship determination step and a contract document that has been determined to be of the least priority in said contract document priority determination step;

an integration step of integrating remaining contract documents into an integrated contract document after the processing performed in said first deletion processing step is complete;

a second deletion processing step of extracting and deleting an overlapping portion from the integrated contract document that has been integrated in said integration step;

a contract document authorization step of authorizing the integrated contract document that has been subjected to the processing performed in said second deletion processing step; and a program installation step of installing the plurality of programs that correspond to the integrated contract document that has been authorized in said contract document authorization step, at least some of said steps being performed by means of a computer.

5. The contract document integration method according to claim 4, further comprising:

a program producer determination step of determining whether or not there are two or more programs produced by the same producer among the plurality of programs from producer information included in each of the plurality of contract documents, wherein said second deletion processing step includes extracting and deleting an overlapping portion from the integrated contract document in which contract documents produced by the same producer have been integrated, and wherein the contract document authorization step includes authorizing integrated the integrated contract document after the processing performed in said second deletion processing step is complete.

6. A non-transitory, computer-readable storage medium storing, in executable form, a contract document integration program that when executed causes a computer to perform a contract document integration method comprising:

a contract document dependency relationship determination step of determining, when a plurality of programs and a plurality of contract documents that correspond to each of the plurality of programs are acquired from an external apparatus, whether or not there is a contract document included in another contract document among the plurality of contract documents from contract document dependency relationship information included in each of the plurality of contract documents;

a contract document priority determination step of determining a priority order among the plurality of contract documents from contract document priority information included in each of the plurality of contract documents;

a first deletion processing step of deleting a contract document that has been determined to be included in another contract document in said contract document dependency relationship determination step and a contract document that has been determined to be of the least priority in said contract document priority determination step;

an integration step of integrating remaining contract documents into an integrated contract document after the processing performed in said first deletion processing step is complete;

a second deletion processing step of extracting and deleting an overlapping portion from the integrated contract document that has been integrated in said integration step;

a contract document authorization step of authorizing the integrated contract document that has been subjected to the processing performed in said second deletion processing step; and a program installation step of installing the plurality of programs that correspond to the integrated contract document that has been authorized in said contract document authorization step.

7. A program distribution method in a program distribution system comprising a program distribution server and an image forming apparatus, the program distribution method comprising:

in the program distribution server:

a program search step of searching a plurality of a programs to be distributed;

a contract document search step of searching a plurality of contract documents corresponding to each of the plurality of programs that has been searched in said program search step;

a first integration step of integrating the plurality of programs that have been searched in said program search step and the plurality of contract documents that have been searched in said contract document search step into one data; and a distribution step of distributing the one data that has been integrated in said first integration step to said image forming apparatus, and in said image forming apparatus:

a contract document dependency relationship determination step of determining, when the one data has been received from the program distribution server, whether or not there is any contract document included in another contract document among the plurality of contract documents from contract document dependency relationship information included in each of the plurality of contract documents in the one data;

a contract document priority determination step of determining a priority order among the plurality of contract documents from contract document priority information included in each of the plurality of contract documents;

a deletion processing step of deleting a contract document that has been determined to be included in another contract document in said contract document dependency relationship determination step and a contract document that has been determined to be of the least priority in said contract document priority determination step;

a second integration step of integrating the remaining contract documents after the processing performed in said deletion processing step is complete; and a program installation step of installing the plurality of programs in the one data according to an authorization based on the one data.

* * * * *